United States Patent
Lepper et al.

(10) Patent No.: US 12,326,166 B2
(45) Date of Patent: Jun. 10, 2025

(54) COMBINATION STUD AND PANEL FASTENER

(71) Applicant: Illinois Tool Works Inc., Glenview, IL (US)

(72) Inventors: Mark O. Lepper, Oak Park, IL (US); Andrea Fickert, Troy, MI (US)

(73) Assignee: Illinois Tool Works Inc., Glenview, IL (US)

( * ) Notice: Subject to any disclaimer, the term of this patent is extended or adjusted under 35 U.S.C. 154(b) by 135 days.

(21) Appl. No.: 18/138,182

(22) Filed: Apr. 24, 2023

(65) Prior Publication Data

US 2023/0349407 A1    Nov. 2, 2023

Related U.S. Application Data

(60) Provisional application No. 63/337,368, filed on May 2, 2022.

(51) Int. Cl.
*F16B 21/07* (2006.01)
*B60R 13/02* (2006.01)
(Continued)

(52) U.S. Cl.
CPC ............ *F16B 5/0642* (2013.01); *B60R 13/02* (2013.01); *F16B 21/071* (2013.01);
(Continued)

(58) Field of Classification Search
CPC .... F16B 21/086; F16B 21/088; F16B 21/071; F16B 21/073; F16B 21/075;
(Continued)

(56) References Cited

U.S. PATENT DOCUMENTS 4,717,100 A * 1/1988 Klein .................... F16B 21/086
248/74.1
5,291,639 A * 3/1994 Baum ................. F16B 37/0842
24/453
(Continued)

FOREIGN PATENT DOCUMENTS

AT           524862 A4    10/2022
CN         104534178 A     4/2015
(Continued)

OTHER PUBLICATIONS

Examination report dated Jan. 30, 2024 in German application No. 10 2023 113 335.7 (7 pages).

*Primary Examiner* — Flemming Saether
(74) *Attorney, Agent, or Firm* — McAndrews, Held & Malloy, Ltd.

(57) ABSTRACT

Described is a combination fastener for attaching an object to a stud extending from or an opening formed in a component. The combination fastener includes a carrier portion to retain the object and a fastener portion. The fastener portion includes a body sidewall that defines a central longitudinal axis and a hollow space configured to receive the stud. A plurality of stud-retention features are resiliently coupled to an interior surface of the body sidewall to retain the stud within the hollow space. Each of the plurality of stud-retention features are angled toward the central longitudinal axis to deflect outward from the central longitudinal axis as the stud passes through the hollow space. A plurality of panel-retention features resiliently coupled to an exterior surface of the body sidewall to retain the combination fastener within the opening.

20 Claims, 9 Drawing Sheets

(51) Int. Cl.
  *F16B 5/06* (2006.01)
  *F16B 21/08* (2006.01)
  *F16B 37/08* (2006.01)
(52) U.S. Cl.
  CPC .......... *F16B 21/075* (2013.01); *F16B 21/086* (2013.01); *F16B 37/0842* (2013.01)
(58) Field of Classification Search
  CPC ... F16B 37/0842; Y10T 24/3444; H02G 3/32; F16L 3/22; F16L 3/222
  USPC ...... 411/508, 433, 437; 248/68.1, 74.1, 74.4
  See application file for complete search history.

(56) References Cited

U.S. PATENT DOCUMENTS

| | | | | |
|---|---|---|---|---|
| 6,290,201 | B1* | 9/2001 | Kanie | F16L 3/20 |
| | | | | 248/68.1 |
| 6,450,459 | B2* | 9/2002 | Nakanishi | F16L 3/223 |
| | | | | 248/68.1 |
| 6,915,990 | B2* | 7/2005 | Maruyama | F16L 55/035 |
| | | | | 248/62 |
| 7,059,022 | B2* | 6/2006 | Yuta | F16B 19/008 |
| | | | | 24/297 |
| 7,086,630 | B2* | 8/2006 | Maruyama | F16L 3/233 |
| | | | | 248/68.1 |
| 8,579,570 | B2* | 11/2013 | Fellows | F16B 37/0842 |
| | | | | 411/177 |
| 8,684,321 | B2* | 4/2014 | Shirakabe | F16L 3/2235 |
| | | | | 24/297 |
| 8,753,055 | B2* | 6/2014 | Ruckel | F16B 37/043 |
| | | | | 411/301 |
| 8,979,461 | B2 | 3/2015 | Pearson | |
| 10,018,214 | B2 | 7/2018 | Yon | |
| 10,385,901 | B2 | 8/2019 | Steltz | |
| 11,365,840 | B2 | 6/2022 | Gauthier | |
| 2019/0040982 | A1 | 2/2019 | Cantrell | |
| 2023/0349407 | A1 | 11/2023 | Lepper | |
| 2023/0383868 | A1 | 11/2023 | Lee | |
| 2023/0417265 | A1 | 12/2023 | Benoit | |

FOREIGN PATENT DOCUMENTS

| | | |
|---|---|---|
| DE | 4123430 C1 | 6/1992 |
| DE | 10230747 B3 | 4/2004 |
| DE | 102005056777 B3 | 11/2006 |
| DE | 102006013899 B3 | 11/2006 |
| DE | 102009011864 A1 | 9/2010 |
| DE | 102012012574 A1 | 10/2013 |
| DE | 102015016710 B3 | 1/2017 |
| DE | 102018219440 A1 | 5/2020 |
| DE | 202020103903 U1 | 7/2020 |
| EP | 1445845 A2 | 8/2004 |
| EP | 3573205 A1 | 11/2019 |
| EP | 3943795 A1 | 1/2022 |
| EP | 4060217 A1 | 9/2022 |
| FR | 3131761 A1 | 7/2023 |

* cited by examiner

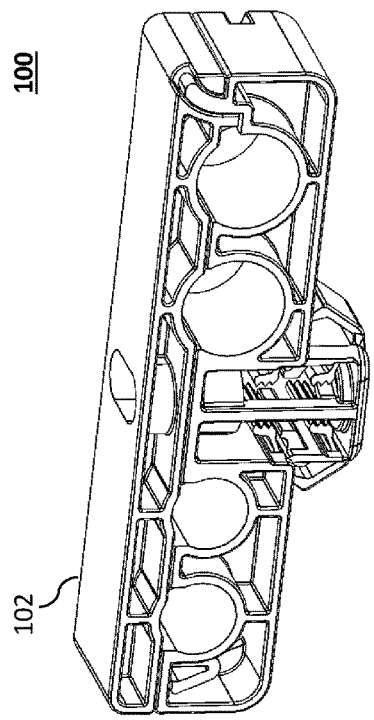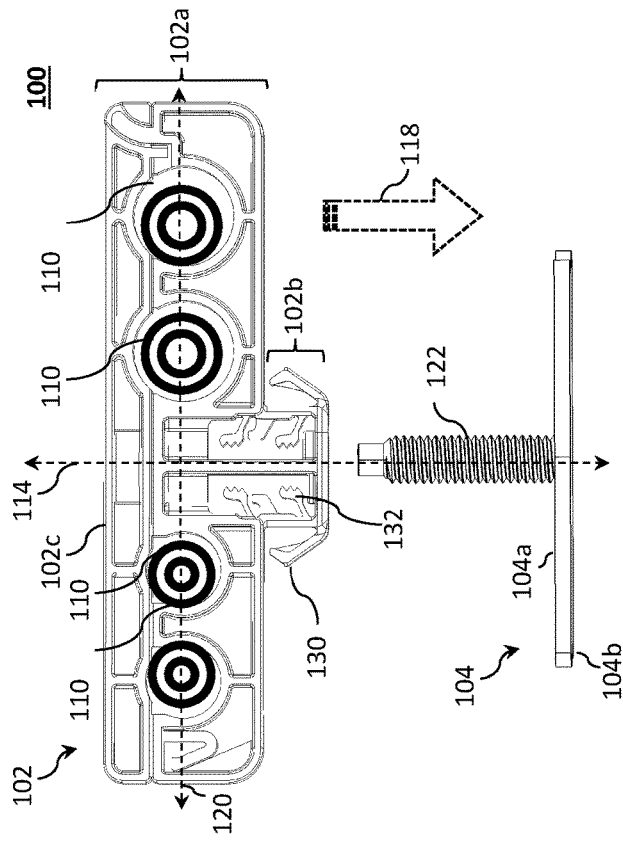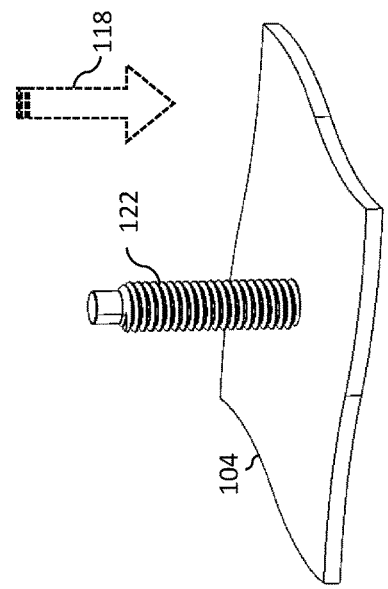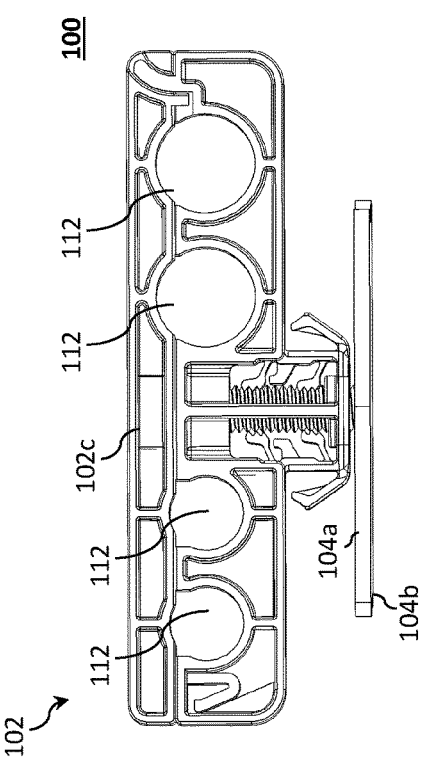
FIG. 1a
FIG. 1b
FIG. 1c

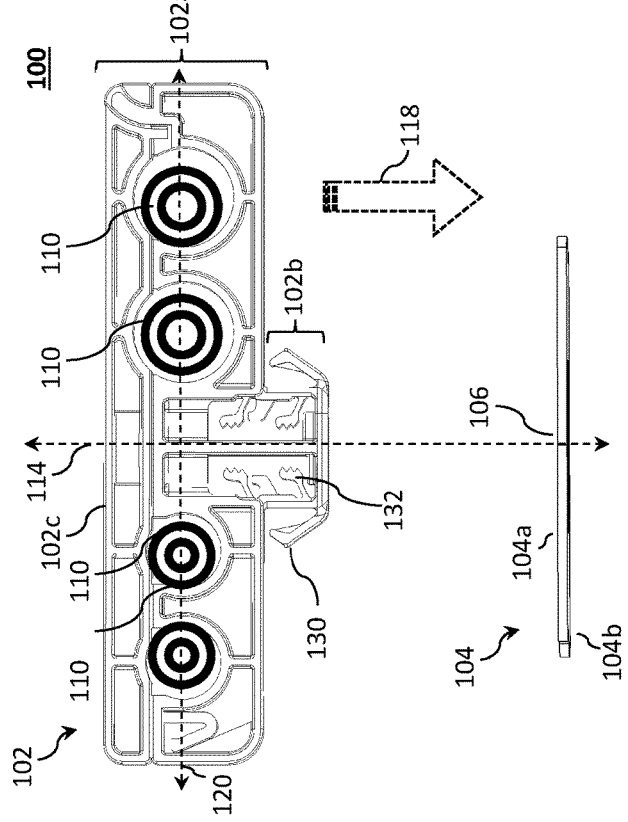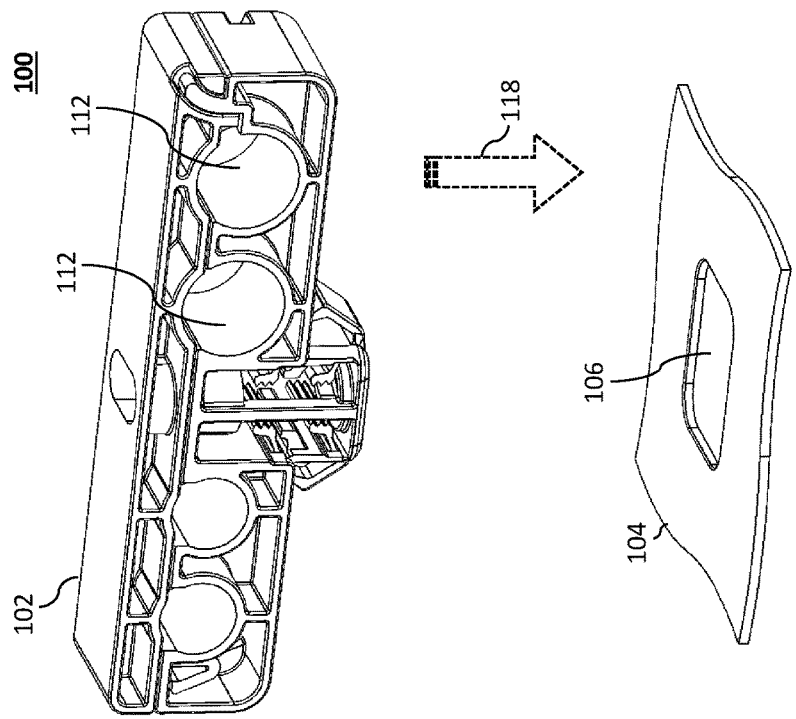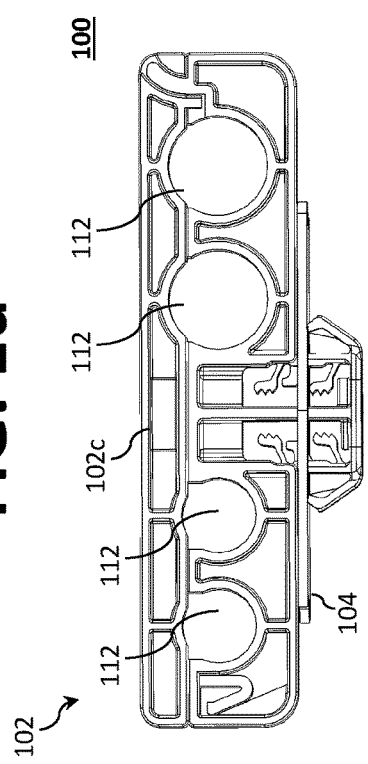
FIG. 1d
FIG. 1e
FIG. 1f

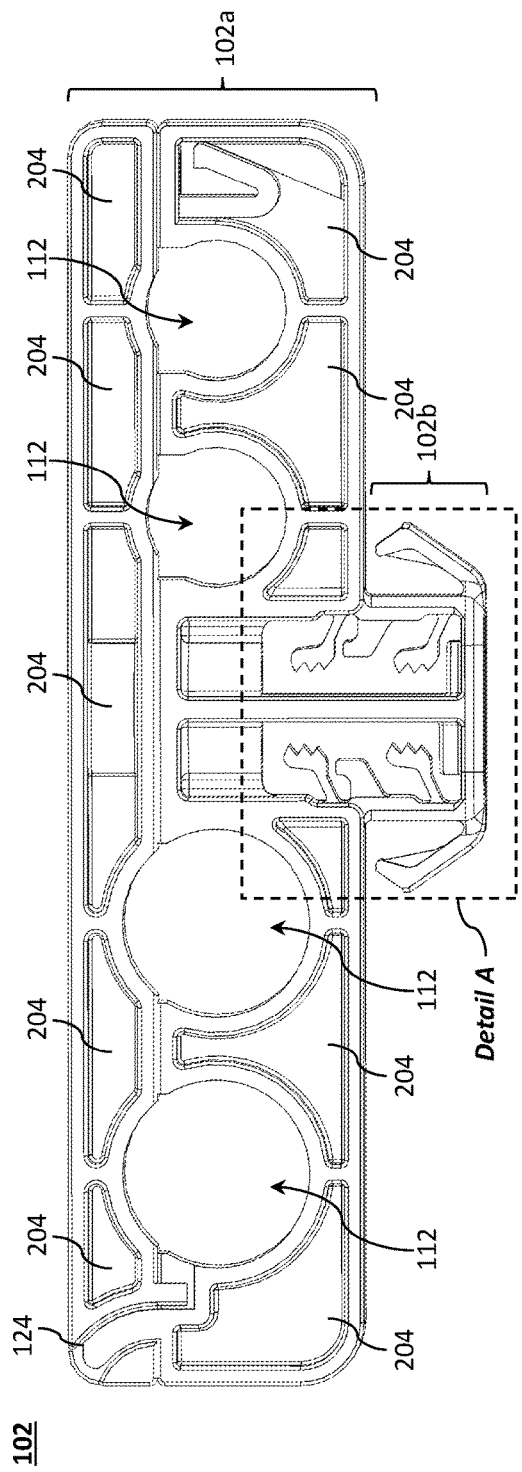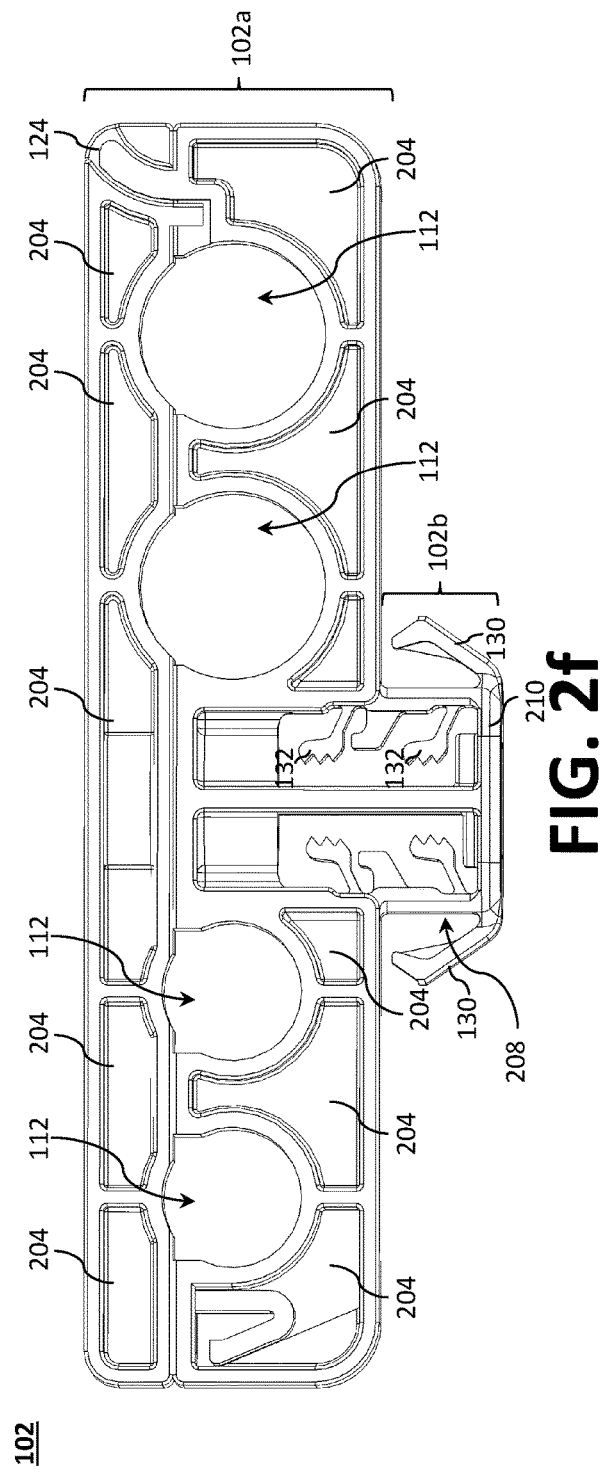

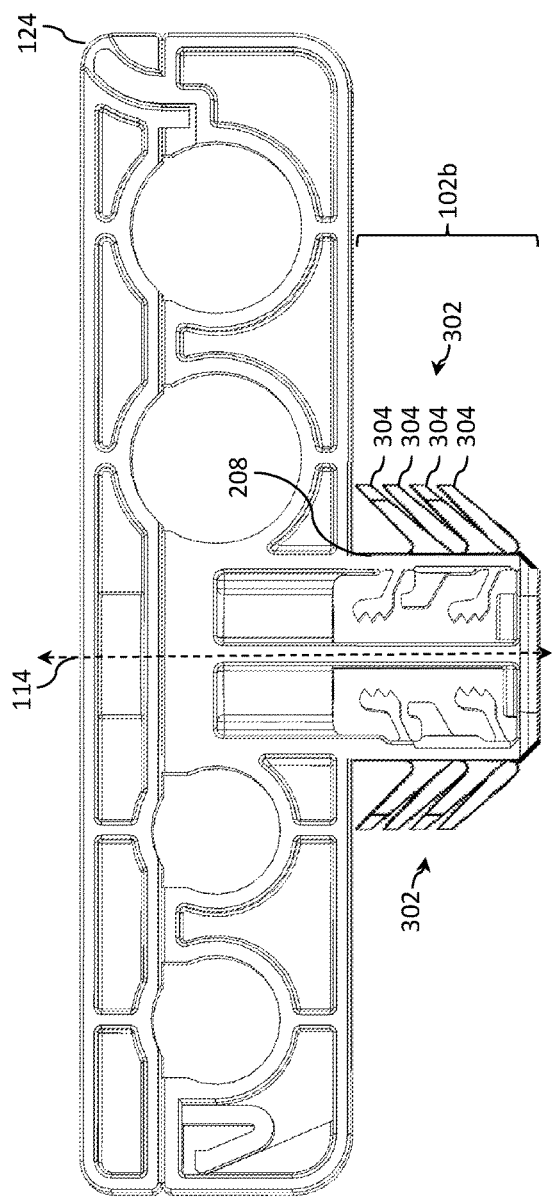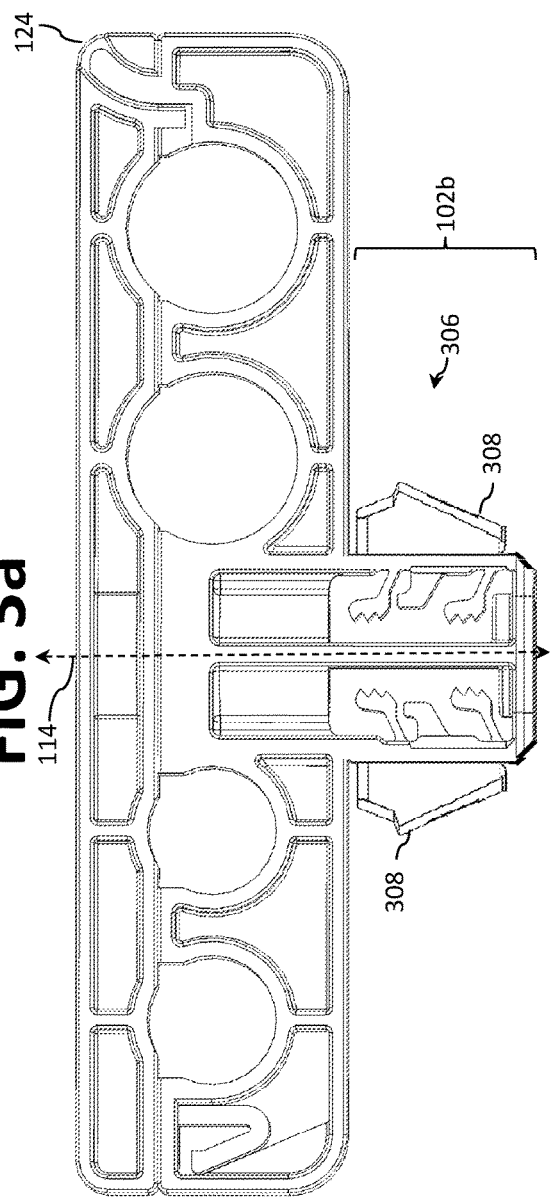

COMBINATION STUD AND PANEL FASTENER

RELATED APPLICATION

The present application claims priority to U.S. Provisional Patent Application No. 63/337,368, filed May 2, 2022, and entitled "Combination Stud and Panel Fastener," which is hereby incorporated by reference in its entirety.

BACKGROUND

Vehicular (e.g., automotive) components require attachment and fastening techniques that are simple to manufacture and assemble. In some instances, objects need to be secured to the vehicle to mitigate movement and/or shifting during operation, which can result in damage, kinking, or rattling to the object. For example, tube, hoses, wires, and other conduits are often secured to the vehicle components via a tube fastener.

Fastening techniques for attaching tube fasteners should above all be reliable and efficient. In some examples, the tube fastener can be secured to the vehicle via a panel opening formed therein or a stud formed thereon. To that end, the tube fastener can include either a stud fastener feature to engage a stud associated with a vehicular component or a panel fastener feature to engage a panel opening associated with the vehicular component. This, however, often requires that an end-user stock two different fasteners in their inventory—one to address studs and one to address openings.

Therefore, despite advancements to date, it would be highly desirable to have a fastener with improved assembly characteristics that is configured to engage both a stud and a panel opening.

SUMMARY

The present disclosure relates generally to a fastening system to form a connection between two components, such as vehicular components and tubes (or other objects), using a combination fastener that can couple with a stud or a panel opening, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIGS. 1a through 1c illustrate a fastening system configured to secure one or more tubes relative to a component having a stud thereon via a combination fastener in accordance with an aspect of this disclosure.

FIGS. 1d through 1f illustrate a fastening system configured to secure the one or more tubes relative to a component having an opening formed therein via the combination fastener.

FIG. 2b illustrates an underside isometric view of the combination fastener of FIG. 2a.

FIGS. 2c and 2d illustrate, respectively, top plan and bottom plan views of the combination fastener of FIG. 2a.

FIGS. 2e and 2h illustrate, respectively, front, rear, first side, and second side elevation views of the combination fastener.

FIG. 2i illustrates a detailed view of the fastener portion of the combination fastener of FIG. 2a.

FIGS. 3a and 3b illustrate fastener portions in accordance with other aspects of this disclosure.

DESCRIPTION

Figure 1G:
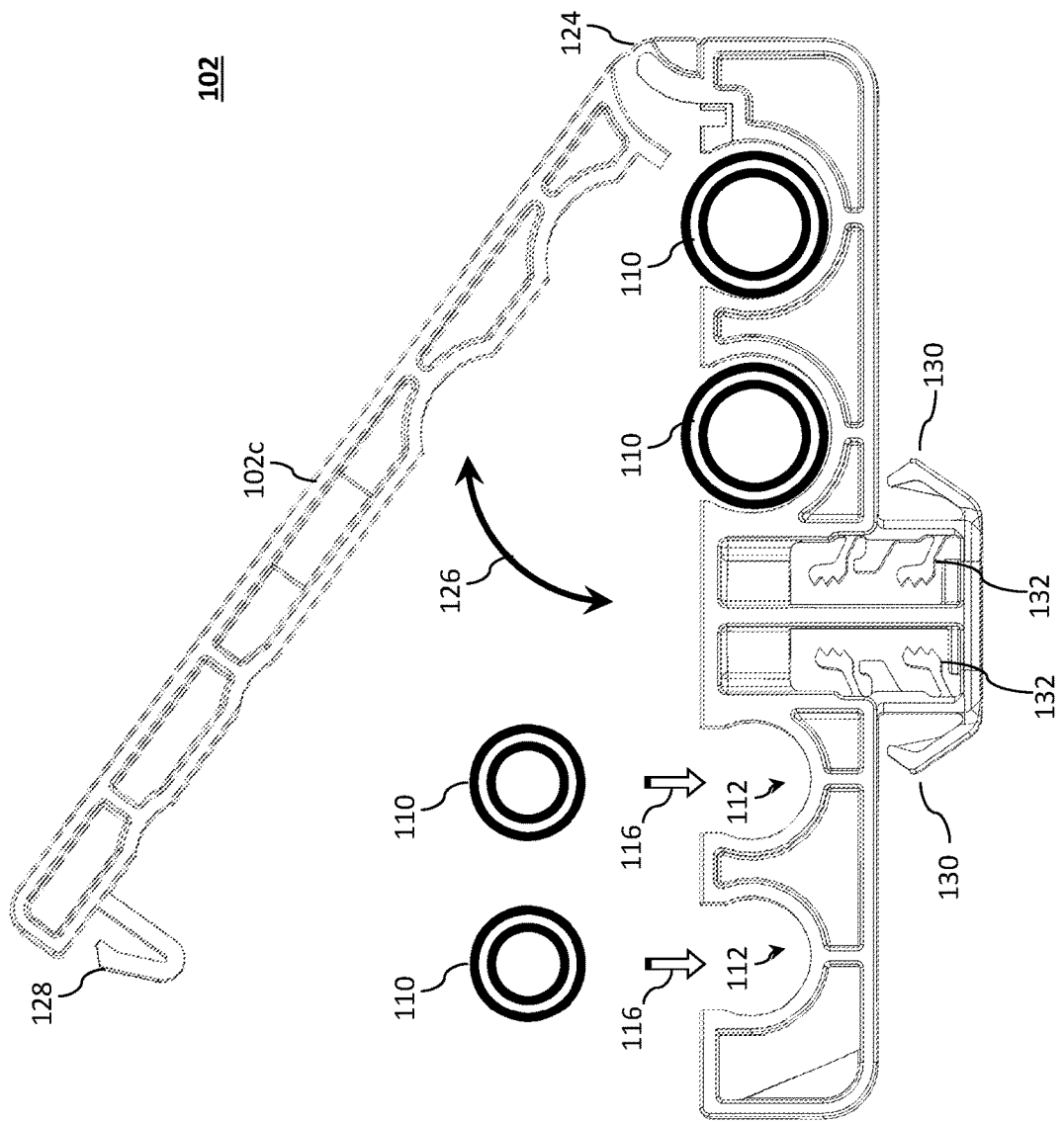
FIG. 1g illustrates the combination fastener in an open position to facilitate loading of one or more tubes into its respective pocket

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A combination fastener can be used to couple an object to a component, such as a tube to a vehicular component. Because a component sometimes uses a stud, an opening, or a combination there of, it is desirable to provide a single fastener that can be used to couple with a stud or an opening, thereby increasing convenience to the end-user/installer. In one example, the combination fastener is a combination tube fastener for securing at least one tube relative to a component. The combination tube fastener can include a carrier portion and a fastener portion. For example, the carrier portion can be a routing structure configured to secure the at least one tube relative to one another and the component via one or more tube pockets. The fastener portion is configured to engage the component via either an opening formed therein or a stud formed thereon.

In one example, a combination fastener for attaching an object to a stud extending from or an opening formed in a component is disclosed. The combination fastener comprises a carrier portion configured to retain the object and a fastener portion. The body portion has a body sidewall that defines a central longitudinal axis and a hollow space configured to receive the stud. The fastener portion has a plurality of panel-retention features and a plurality of stud-retention features resiliently coupled to an interior surface of the body sidewall. The plurality of stud-retention features are configured to retain the stud within the hollow space. Each of the plurality of stud-retention features are angled toward the central longitudinal axis and are configured to deflect outward from the central longitudinal axis as the stud passes through the hollow space. The plurality of panel-retention features resiliently coupled to an exterior surface of the body sidewall and configured to retain the combination fastener within the opening.

In another example, a combination tube fastener for attaching at least one tube to a stud extending from or an opening formed in a component, the combination fastener comprises a carrier portion and a fastener portion. The carrier portion is configured to retain the at least one tube and comprises a pocket configured to retain the tube. The fastener portion coupled to the carrier portion and having a body sidewall that defines a central longitudinal axis and a hollow space configured to receive the stud. The fastener portion having a plurality of stud-retention features and a plurality of panel-retention features. The plurality of stud-retention features are resiliently coupled to an interior surface of the body sidewall and configured to retain the stud within the hollow space. Each of the plurality of stud-retention features are angled toward the central longitudinal axis and are configured to deflect outward from the central longitudinal axis as the stud passes through the hollow space. The plurality of panel-retention features resiliently coupled to an exterior surface of the body sidewall and configured to retain the combination fastener within the opening.

In another example, a combination fastener for attaching an object to a stud extending from or an opening formed in a component is disclosed. The combination fastener comprises a body sidewall and a plurality of stud-retention features. The body sidewall defines a central longitudinal axis and a hollow space configured to receive the stud. The plurality of stud-retention features are resiliently coupled to an interior surface of the body sidewall and configured to retain the stud within the hollow space. Each of the plurality of stud-retention features is angled toward the central longitudinal axis and are configured to deflect outward from the central longitudinal axis as the stud passes through the hollow space. The plurality of panel-retention features are resiliently coupled to an exterior surface of the body sidewall and configured to retain the combination fastener within the opening.

In some examples, the plurality of panel-retention features comprises a plurality of legs arranged as a clip assembly. For example, the clip assembly can a "W-type" clip assembly. In some examples, each of the plurality of stud-retention features includes a return arm resiliently connected to the body sidewall and configured to deflect as the as the stud passes through the hollow space. Each of the panel-retention features may comprise a foot positioned at a distal end of the return arm. The foot can comprise one or more friction features.

In some examples, the combination fastener is fabricated as a unitary structure. For example, the combination fastener is fabricated as a unitary structure via an additive manufacturing technique. In some examples, a leading end of the body sidewall is chamfered along an inner perimeter to align and guide the stud into the hollow space during assembly. In some examples, a leading end of the body sidewall is chamfered along an outer perimeter to align and guide the fastener portion into the opening during assembly. In some examples, the plurality of panel-retention features comprises a plurality of fins arranged as a push-pin assembly. In some examples, the plurality of panel-retention features comprises a plurality of box-prong legs arranged as a box-prong assembly. In some examples, the object is a tube and the carrier portion comprises a pocket configured to retain the tube. The carrier portion can comprise a lid configured to secure the tube in the pocket, wherein the lid is coupled to the carrier portion via a hinge.

FIGS. 1a through 1c illustrate a fastening system 100 in accordance with an aspect of this disclosure that is configured to secure one or more tubes 110 relative to a component 104 having a stud 122 thereon via a combination fastener 102, while FIGS. 1d and 1f illustrate a fastening system 100 configured to secure the one or more tubes 110 relative to a component 104 having an opening 106 formed therein via the combination fastener 102. More specifically, FIGS. 1a through 1b and 1d through 1e illustrate assembly views of the fastening system 100, while FIGS. 1c and 1f illustrate assembled views thereof. Finally, FIG. 1g illustrates the combination fastener 102 in an open position to facilitate loading of the one or more tubes 110 into its respective pocket 112. While the combination fastener 102 will be described primarily as a combination fastener configured to attached tubes 110, the combination fastener 102 can be used to attach other objects and components.

In the illustrated example, the component 104 defines an A-side surface 104a (e.g., a first surface, such as an exterior surface) and a B-side surface 104b (e.g., a second surface, such as an interior surface). The one or more tubes 110 are illustrated as being secured to or on the A-side surface 104a. The component 104 may be, for example, an automotive panel, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like. Depending on the application, the component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof.

The combination fastener 102 may include, define, or otherwise provide a carrier portion 102a and a fastener portion 102b. As illustrated, the fastener portion 102b is generally perpendicular to the carrier portion 102a such that a central longitudinal axis 114 runs down the center of the fastener portion 102b is generally perpendicular to a central lateral axis 120 that runs along the carrier portion 102a. The fastener portion 102b can be integrated with the carrier portion 102a or attached during assembly (e.g., via adhesives, a welding process, a mechanical coupling, or the like). In the illustrated example, the fastener portion 102b is partially recessed into the carrier portion 102a to minimize the distance between the component 104 and the carrier portion 102a when assembled.

The carrier portion 102a is configured to couple with and/or secure one or more objects (illustrated as tubes 110) relative to one another and, ultimately, the component 104. For example, the carrier portion 102a is illustrated with a plurality of pockets 112, each of which is configured to secure a tube 110. As illustrated, each of the plurality of pockets 112 can be shaped as a cylindrical channel (when in a closed position, as illustrated in FIGS. 1a through 1f) with an inner diameter that generally corresponds to an outer diameter of the tubes 110. The one or more tubes 110 may be, for example, brake lines, fuel lines, wires, cables (e.g., electric cables), pipes, and/or any other tubular structure that may be secured to a component 104. In the illustrated example, the combination fastener 102 is configured to retain tubes 110 of different diameters.

In some examples, the carrier portion 102a may include a lid 102c to secure the one or more tubes 110 within one or more of the plurality of pockets 112. As best illustrated in FIG. 1g, the lid 102c can be pivoted about a hinge 124 between an open position (FIG. 1g) and the closed position (FIGS. 1a through 1f) as indicated by arrow 126 to provide access to the plurality of pockets 112 during installation of the one or more tubes 110 (or other objects). When in the open position, a tube 110 can be inserted into each of the plurality of pockets 112 by urging the tube 110 toward the respective tube pocket 112 in the direction indicated by arrow 116. Once the one or more tubes 110 are inserted, the lid 102c can be pivoted about the hinge 124 to the closed position. In the illustrated example, a snap 128 is further provided a free end of the lid 102c (e.g., opposite the hinge 124) that is configured to engage a corresponding feature of the carrier portion 102a, such as a ledge, edge, or other protrusion.

In lieu of the lid 102c, the plurality of pockets 112 may be shaped to secure the one or more tubes 110 via an interference fit (e.g., via one features positioned at the opening to the plurality of pockets 112, such a ledges, bumps, etc.). While four pockets 112 are illustrated, additional or fewer pockets 112 may be provided depending on the design needs (e.g., the number of tubes 110 that need to be secured). The width of the carrier portion 102a would be adjusted accordingly to accommodate the desired number of pockets 112 and/or tubes 110.

The fastener portion 102b of the illustrated combination fastener 102 serves to couple the carrier portion 102a to the component 104. A benefit of the described combination fastener 102 is that it is compatible with and can secure to either a stud 122 (e.g., a post) or an opening 106 (e.g., a hole) via the fastener portion 102b. To that end, fastener portion 102b includes both panel-retention features 130 configured to engage the opening 106 and stud-retention features 132 configured to engage the stud 122. As illustrated, the plurality of stud-retention features 132 extend inwardly toward the central longitudinal axis 114 to grip a stud 122, whereas the panel-retention features 130 extend outwardly away the central longitudinal axis 114 to engage the opening 106.

As best illustrated in FIGS. 1a through 1c, the component 104 may include, define, or otherwise provide the stud 122, which may be formed during manufacturing of the component 104 or attached during assembly. During installation, the fastener portion 102b of the combination fastener 102 is inserted over and slides onto the stud 122 formed in or on a surface of the component 104 as indicated by the arrow 118 to engage the stud-retention features 132. In the illustrated example, the stud 122 is threaded (or ribbed) to increase fastening strength once assembled by increasing the friction between the stud 122 and the stud-retention features 132.

Now turning to FIGS. 1d through 1f, the component 104 may additionally or alternatively include, define, or otherwise provide the opening 106, which may be formed during manufacturing of the component 104. During installation, the fastener portion 102b of the combination fastener 102 is inserted into the opening 106 formed in or on a surface of the component 104 as indicated by the arrow 118 such that the panel-retention features 130 engage the opening 106 (e.g., the perimeter of the component 104 that defines the opening). In some examples, the combination fastener 102 may comprise a seal when desirable to mitigate dust, dirt, and/or moisture penetration through the opening 106. The seal may be embodied as a ring (e.g., an annulus) and fabricate from foam material, thermoplastic, rubber, etc. For example, a seal can be configured to fit over the distal end of the combination fastener 102 to surround a portion of the fastener portion 102b (e.g., the shank). The combination fastener 102 may include additional features, such as ribs and wings to mitigate noise and/or rattle between the combination fastener 102 and the component 104.

The combination fastener 102 may be formed as a unitary structure. In one example, the combination fastener 102 can be fabricated via mold tooling and a plastic-injection molding process. In another example, the combination fastener 102 can be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, the combination fastener 102 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

Additive manufacturing techniques print objects in three dimensions, therefore both the minimum feature size (i.e., resolution) of the X-Y plane (horizontal resolution) and the layer height in Z-axis (vertical resolution) are considered in overall printer resolution. Horizontal resolution is the smallest movement the printer's extruder can make within a layer on the X and the Y axis, while vertical resolution is the minimal thickness of a layer that the printer produces in one pass. Printer resolution describes layer thickness and X-Y resolution in dots per inch (DPI) or micrometers (μm). The particles (3D dots) in the horizontal resolution can be around 50 to 100 μm (510 to 250 DPI) in diameter. Typical layer thickness (vertical resolution) is around 100 μm (250 DPI), although the layers may be as thin as 16 μm (1,600 DPI). The smaller the particles, the higher the horizontal resolution (i.e., higher the details the printer produces). Similarly, the smaller the layer thickness in Z-axis, the higher the vertical resolution (i.e., the smoother the printed surface will be). A printing process in a higher vertical resolution printing, however, will take longer to produce finer layers as the printer has to produce more layers. In some examples, the combination fastener 102 may be formed or otherwise fabricated at different resolutions during a printing operation. For example, the carrier portion 102*a* (or portions thereof) may be printed at a lower resolution than that of the fastener portion 102*b* or vice versa as needed for a particular application.

Figure 2A:
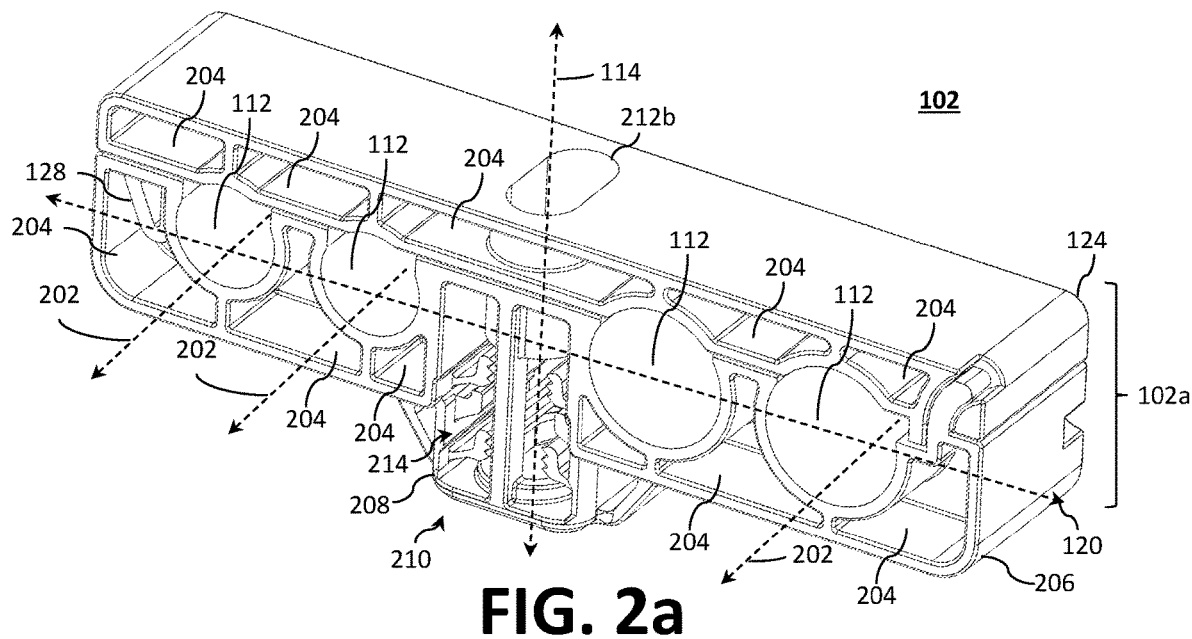
FIG. 2a illustrates a topside isometric view of the combination fastener of FIGS. 1a through 1g.
Figure 2B:
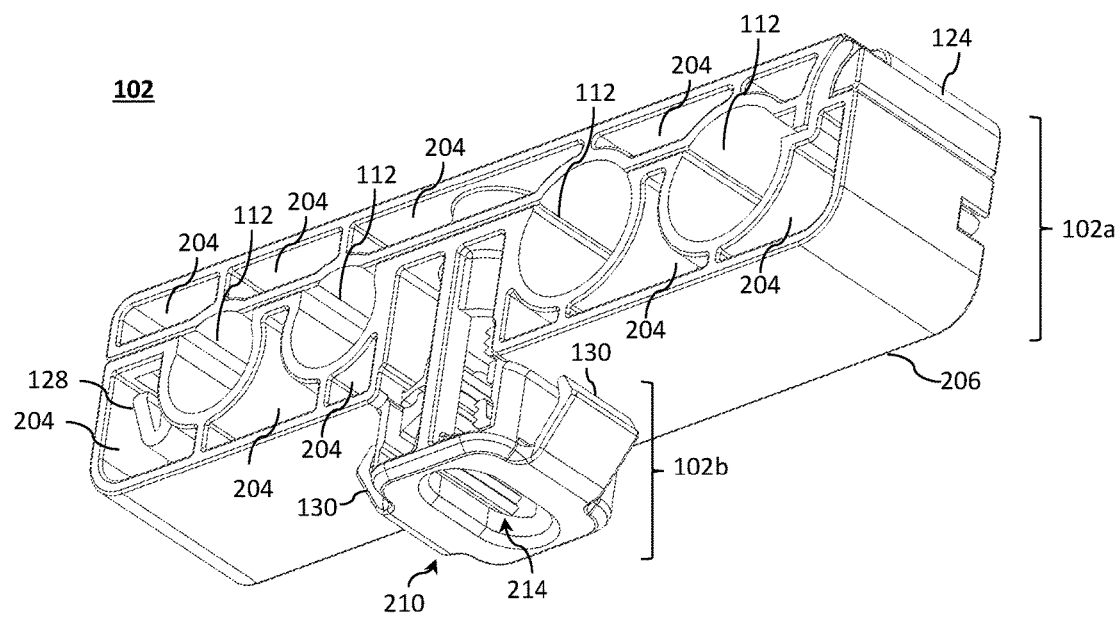
Figure 2C:
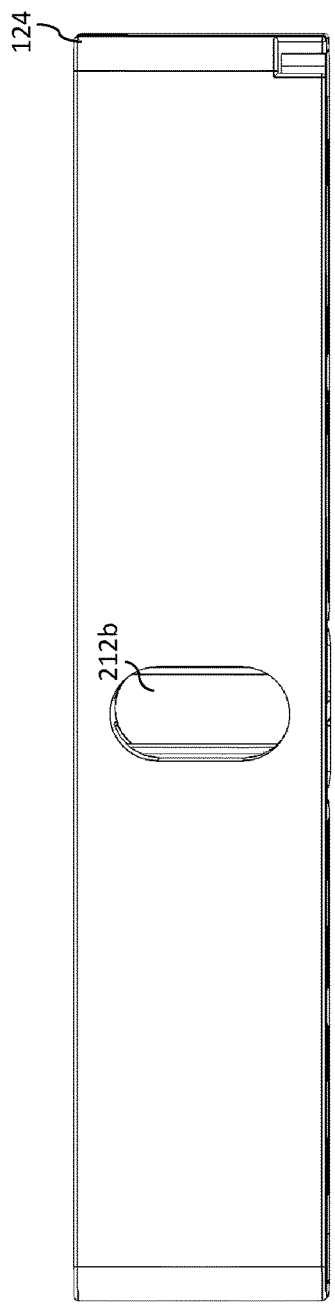
Figure 2D:
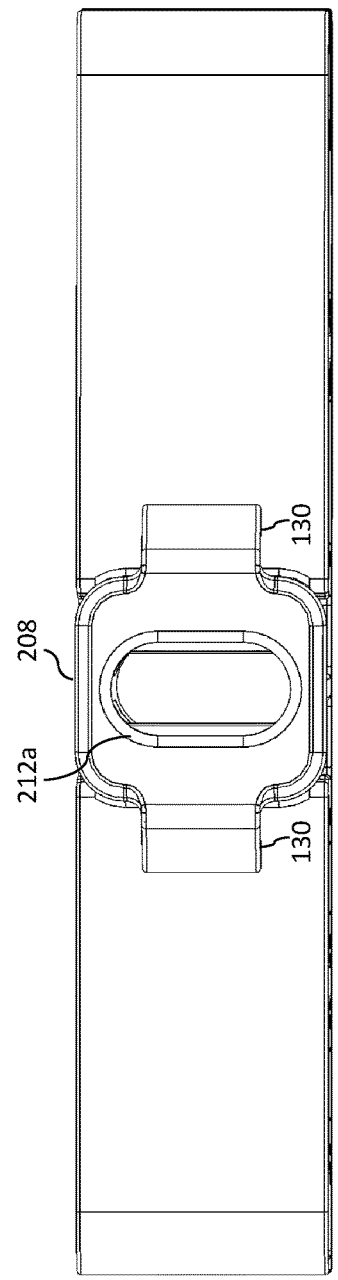
Figure 2H:
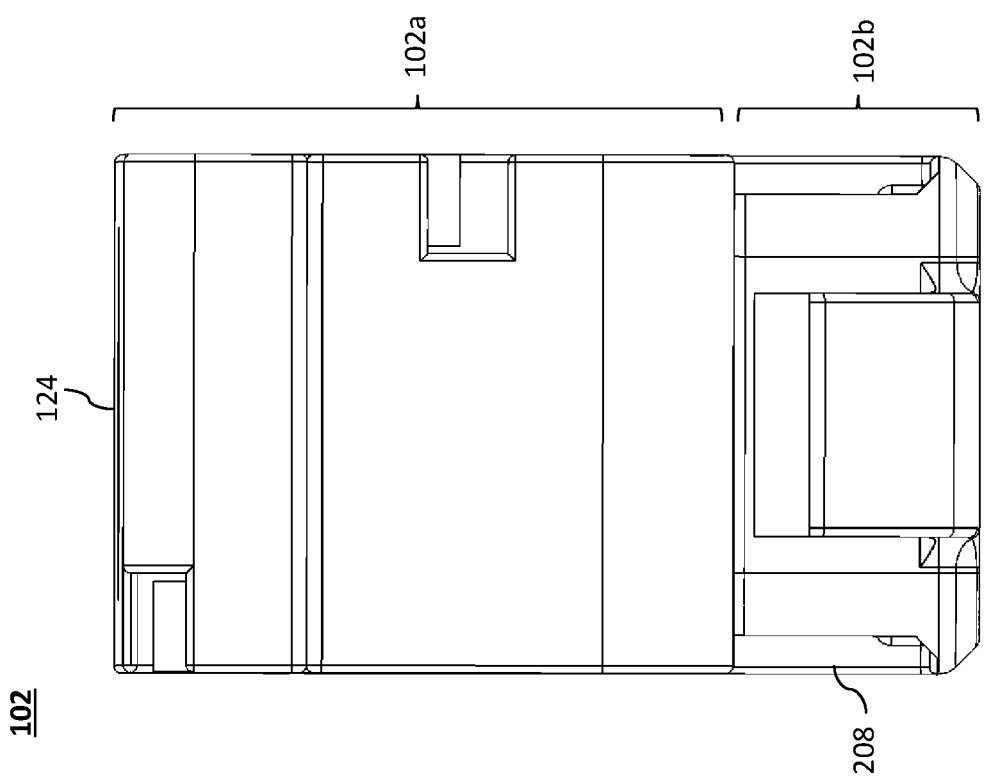
Figure 2G:
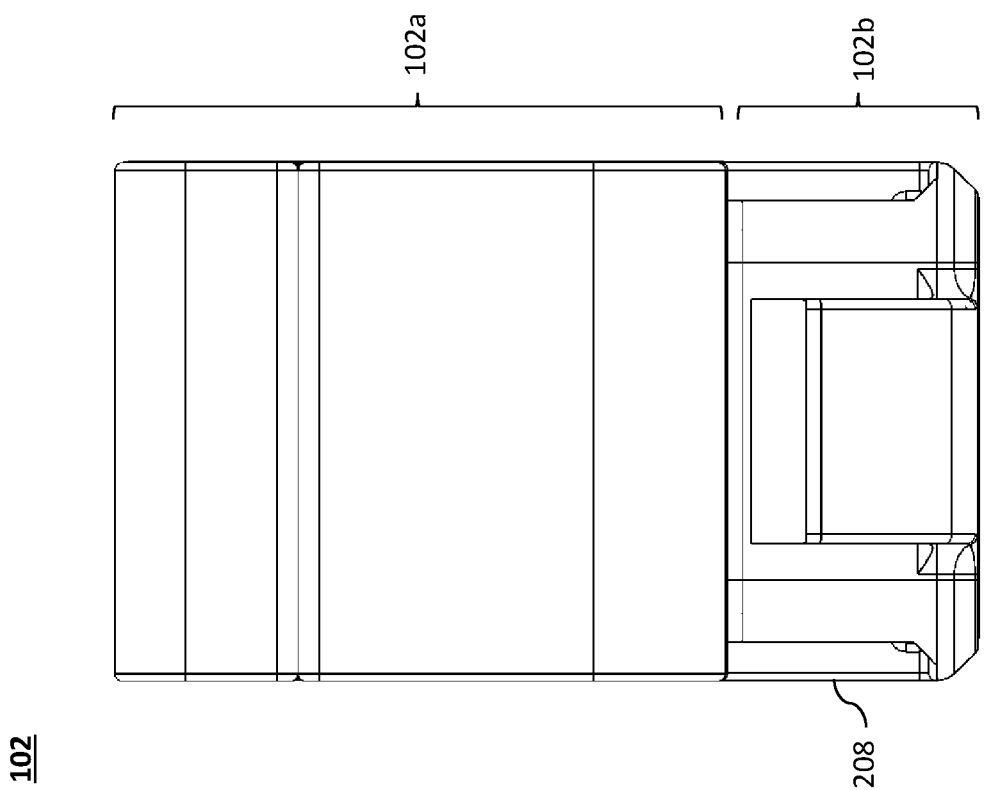
Figure 2I:
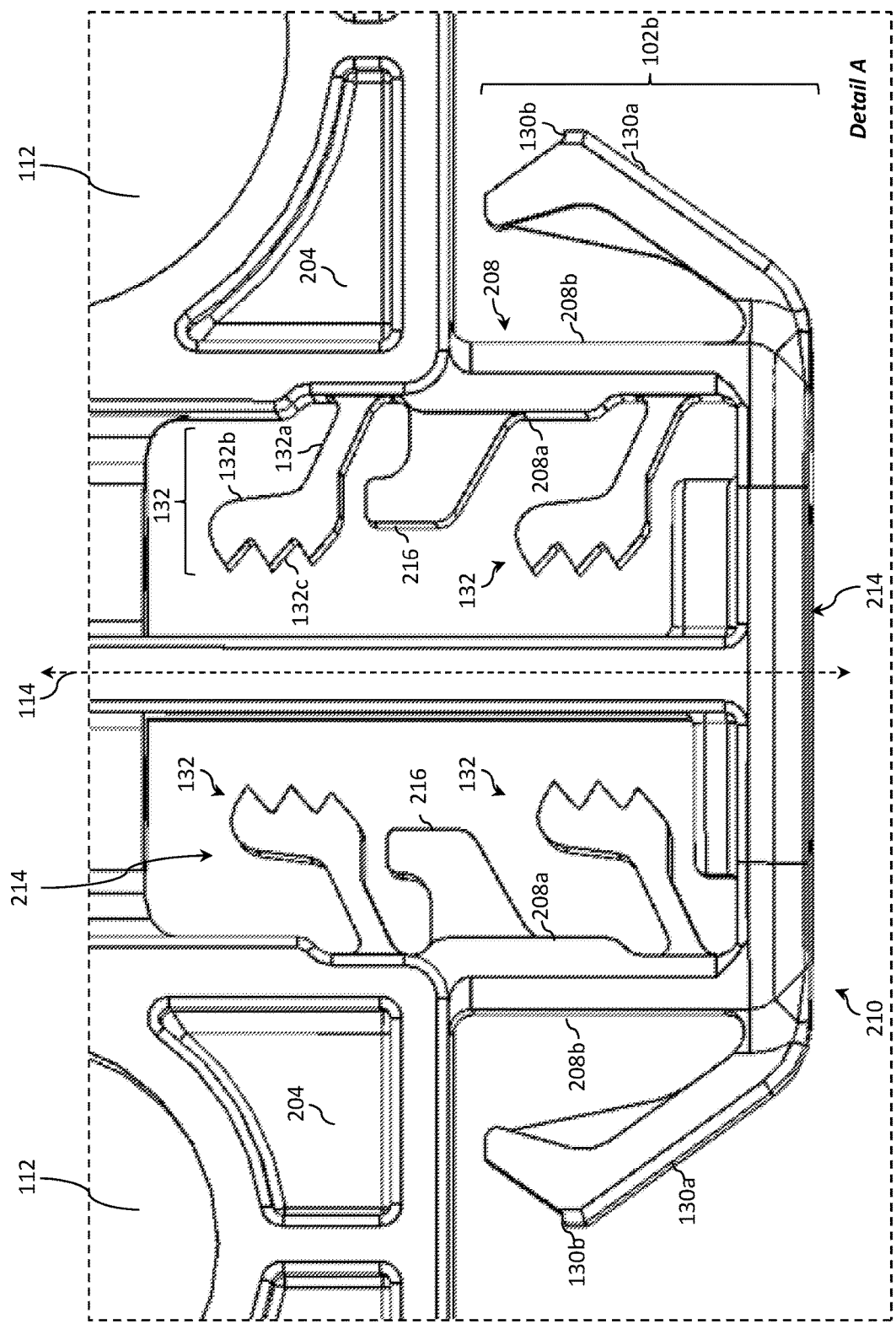

FIGS. 2*a* through 2*h* illustrate the example combination fastener 102 of FIGS. 1*a* through 1*d* in greater detail. Specifically, FIG. 2*a* illustrates a topside isometric view of the combination fastener 102, while FIG. 2*b* illustrates an underside isometric view of the combination fastener 102. FIGS. 2*c* and 2*d* illustrate, respectively, top plan and bottom plan views of the combination fastener 102, while FIGS. 2*e* and 2*h* illustrate, respectively, front, rear, first side, and second side elevation views of the combination fastener 102. FIG. 2*i* illustrates a detailed view of the fastener portion 102*b* (Detail A). As described above, the combination fastener 102 is configured to receive one or more tubes 110 via the carrier portion 102*a* and to engage the component 104 via the fastener portion 102*b* and, depending on the type of component 104, the opening 106 or the stud 122.

As illustrated, each of the plurality of pockets 112 defines a central axis 202 that is perpendicular to both the central longitudinal axis 114 and the central lateral axis 120. When a tube 110 is inserted into the tube pocket 112, the length of the tube 110 aligns and/or is parallel to the central axis 202. In some examples, the combination fastener 102 comprises one or more windows 204 (e.g., recesses, cut outs, or openings) formed in or on a carrier body 206 of the carrier portion 102*a* and/or the fastener portion 102*b*. The one or more windows 204 can serve to reduce the amount of material needed to fabricate the combination fastener 102, thus reducing material cost and part weight.

The illustrated fastener portion 102*b* generally comprises a body sidewall 208 that defines (or otherwise includes) a hollow space 214. The plurality of stud-retention features 132 extend inwardly from the body sidewall 208 and toward the central longitudinal axis 114, while the panel-retention features 130 extend outwardly from the body sidewall 208 away the central longitudinal axis 114 to engage the opening 106. The body sidewall 208 defines a leading end 210 configured to, depending on the type of component 104, be inserted into an opening 106 or to receive an end of the stud 122 into the hollow space 214 via a first opening 212*a*.

The leading end 210 can be rounded, tapered, or otherwise shaped to increase insertion ease of the stud 122 to the body sidewall 208. For example, the leading end 210 of the body sidewall 208 can be chamfered along the inner perimeter to help align and guide the stud 122 into the body sidewall 208 during assembly and/or chamfered along the outer perimeter to help align and guide the leading end 210 through the opening 106.

In the illustrated example, the body sidewall 208 defines the first opening 212*a* and a second opening 212*b* with the hollow space 214 positioned therebetween. Depending on the stud length, a stud 122 can pass through the first opening 212*a* of the leading end 210 into the hollow space 214, engage the plurality of stud-retention features 132, and exit (at least partially) out of the second opening 212*b*. While the leading end 210 and the opposite end having the second opening 212*b* are each illustrated as open, the second opening 212*b* may be omitted. In the illustrated example, the hollow space 214 and various components of the fastener portion 102*b* can be partially recessed into the carrier portion 102*a* to minimize the distance between the component 104 and the carrier portion 102*a* is minimized when used with a stud 122.

The plurality of stud-retention features 132 extend inwardly from an interior surface 208*a* of the body sidewall 208 into the hollow space 214 to retain the stud 122, while the plurality of panel-retention features 130 extend outwardly from an exterior surface 208*b* of the body sidewall 208. The illustrated fastener portion 102*b* further comprises one or more shims 216. The shims 216 extend inwardly from an interior surface of the body sidewall 208 into the hollow space 214 to retain the stud 122, but, unlike the stud-retention features 132, are rigidly coupled to the body sidewall 208 and serve to guide the stud 122 during insertion and mitigate side-to-side movement.

In the illustrated example, two sets of stud-retention features 132 are arranged about the central longitudinal axis 114 and spaced from one another by 180 degrees. Each illustrated set includes a pair of vertically aligned stud-retention features 132. While two sets of stud-retention features 132 are illustrated, one of skill in the art would appreciate that additional or fewer stud-retention features 132 may be used and can be arranged differently. For example, three stud-retention features 132 (whether a single stud or as vertically-aligned sets) may be arranged about the central longitudinal axis 114 and spaced from one another by 120 degrees, four stud-retention features 132 may be arranged about the central longitudinal axis 114 and spaced from one another by 90 degrees, and so forth.

The stud-retention features 132 are inwardly biased and resiliently connected to the body sidewall 208. As best illustrated in FIG. 2*i*, each of the one or more stud-retention features 132 includes a return arm 132*a* resiliently connected to the body sidewall 208 and configured to deflect as the fastener portion 102*b* is passed onto the stud 122 associated with the component 104. A foot 132*b* is formed or located at an end of the return arm 132*a* and configured to engage the stud 122 via an interference fit (e.g., at the outer surface of the stud 122). The foot 132*b* may include one or more friction features 132*c* to increase friction contact with the stud 122. Example friction features 132*c* include ridges, teeth, roughened surface, and the like. The stud-retention features 132 are relatively rigid towards outward forces and as such will lock the fastener portion 102*b* onto the stud 122. While a return arm 132*a* with a foot 132*b* is illustrated, other features can be used to provide an interference fit with the stud 122, such as ribs. Addition details are described in connection with commonly-owned U.S. Pat. No. 8,979,461 to Timothy D. Pearson et al.

The panel-retention features 130 are outwardly biased and resiliently connected to the body sidewall 208. As best illustrated in FIG. 2*i*, the one or more panel-retention features 130 can be configured a clip assembly having a plurality of legs 130*a* resiliently connected to the body sidewall 208 at or near the leading end 210 and configured to deflect toward the central longitudinal axis 114 as the fastener portion 102*b* is passed through an opening 106 formed in the component 104. A catch 130*b* (e.g., a ledge, lip, etc.) may be formed or located at an end of the leg 130*a* to engage the component 104 (e.g., at the perimeter of the opening 106). The panel-retention features 130 are relatively rigid towards outward forces and as such will lock the combination fastener 102 into place within the component 104 once it has passed through the opening 106. Additionally, the fastener 108 may be configured to engage one or more features of the component 104. The panel-retention features 130 may be fabricated in various sizes depending on the application. The illustrated panel-retention features 130 use clips that are arrange in a manner that can be described as a "W-type" fastener—a W-type clip assembly—because it generally resembles a "W" when viewed from a side, as best illustrated in FIG. 2i.

While the panel-retention features 130 are generally described and illustrated as clip-type fastener, as will be discussed, the panel-retention features 130 may adopt various other types of fasteners type for use and integration with the combination fastener 102. FIGS. 3a and 3b illustrate fastener portions 102 in accordance with other aspects of this disclosure.

FIG. 3a illustrates a fastener portion 102b having panel-retention features 130 configured a push-pin assembly 302 (sometimes called trees, pine trees, Christmas trees, etc.). The push-pin assembly 302 includes a plurality of fins 304 arranged along a length of the body sidewall 208 that are resiliently connected to the body sidewall 208 and configured to deflect as the fastener portion 102b is passed through an opening 106 formed in the component 104. The fins 304 may be shaped as blades, teeth, barbs, or the like. As illustrated, the fins 304 are angled away from the central longitudinal axis 114 and are configured to deflect inward toward the central longitudinal axis 114 as the fastener portion 102b is passed through the opening 106 in the component 104. The fins 304 are angled upwardly relative to the central longitudinal axis 114 (forming an acute angle between each fin 304 and the central longitudinal axis 114) to resist pullout forces.

FIG. 3b illustrates a fastener portion 102b having panel-retention features 130 configured a box-prong assembly 306 (illustrated as a 2-legged box-prong fastener) having a pair of box-prong legs 308 arranged on the body sidewall 208 that are resiliently connected to the body sidewall 208 and configured to deflect as the fastener portion 102b is passed through an opening 106 formed in the component 104.

Additional forms of panel-retention features 130 suitable for coupling the combination fastener 102 to the component 104, include, for example, specialty clip assemblies (e.g., a CenterLok™ fastener, which is available from Deltar®), clip assemblies with four retaining legs as further described in connection with commonly-owned U.S. Pat. No. 10,385,901 to Jeffrey J. Steltz, and clip assemblies with snap-engaging seats as further described in connection with commonly-owned U.S. Pat. No. 10,018,214 to Fulvio Pacifico Yon.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A combination fastener for attaching a tube to a stud extending from or an opening formed in a component, the combination fastener comprising:
   a carrier portion configured to retain the tube; and
   a fastener portion having a body sidewall that defines a central longitudinal axis and a hollow space configured to receive the stud, the fastener portion having:
   a plurality of stud-retention features resiliently coupled to an interior surface of the body sidewall and configured to retain the stud within the hollow space, wherein each of the plurality of stud-retention features are angled toward the central longitudinal axis and are configured to deflect outward from the central longitudinal axis as the stud passes through the hollow space; and
   a plurality of panel-retention features resiliently coupled to an exterior surface of the body sidewall and configured to retain the combination fastener within the opening.

2. The combination fastener of claim 1, wherein the plurality of panel-retention features comprises a plurality of legs arranged as a clip assembly.

3. The combination fastener of claim 2, wherein the clip assembly is a "W-type" clip assembly.

4. The combination fastener of claim 1, wherein each of the plurality of stud-retention features includes a return arm resiliently connected to the body sidewall and configured to deflect as the as the stud passes through the hollow space.

5. The combination fastener of claim 4, wherein each of the panel-retention features comprises a foot positioned at a distal end of the return arm.

6. The combination fastener of claim 5, wherein the foot comprises one or more friction features.

7. The combination fastener of claim 1, wherein the combination fastener is fabricated as a unitary structure.

8. The combination fastener of claim 1, wherein the combination fastener is fabricated as a unitary structure via an additive manufacturing technique.

9. The combination fastener of claim 1, wherein a leading end of the body sidewall is chamfered along an inner perimeter to align and guide the stud into the hollow space during assembly.

10. The combination fastener of claim 1, wherein a leading end of the body sidewall is chamfered along an outer perimeter to align and guide the fastener portion into the opening during assembly.

11. The combination fastener of claim 1, wherein the plurality of panel-retention features comprises a plurality of fins arranged as a push-pin assembly.

12. The combination fastener of claim 1, wherein the plurality of panel-retention features comprises a plurality of box-prong legs arranged as a box-prong assembly.

13. The combination fastener of claim 1, wherein the carrier portion comprises a pocket configured to retain the tube.

14. The combination fastener of claim 13, wherein the carrier portion comprises a lid configured to secure the tube in the pocket, wherein the lid is coupled to the carrier portion via a hinge.

15. A combination tube fastener for attaching at least one tube to a stud extending from or an opening formed in a component, the combination tube fastener comprising:
   a carrier portion configured to retain the at least one tube, wherein the carrier portion comprises a pocket configured to retain the tube; and
   a fastener portion coupled to the carrier portion and having a body sidewall that defines a central longitudinal axis and a hollow space configured to receive the stud, the fastener portion having:

a plurality of stud-retention features resiliently coupled to an interior surface of the body sidewall and configured to retain the stud within the hollow space, wherein each of the plurality of stud-retention features are angled toward the central longitudinal axis and are configured to deflect outward from the central longitudinal axis as the stud passes through the hollow space; and a plurality of panel-retention features resiliently coupled to an exterior surface of the body sidewall and configured to retain the combination tube fastener within the opening.

16. A combination fastener for coupling to a stud extending from or an opening formed in a component, the combination fastener comprising:

a carrier portion having a lid coupled to the carrier portion via a hinge and configured to secure an object relative to the carrier portion;

a body sidewall coupled to the carrier portion that defines a central longitudinal axis and a hollow space configured to receive the stud;

a plurality of stud-retention features resiliently coupled to an interior surface of the body sidewall and configured to retain the stud within the hollow space, wherein each of the plurality of stud-retention features are angled toward the central longitudinal axis and are configured to deflect outward from the central longitudinal axis as the stud passes through the hollow space; and a plurality of panel-retention features resiliently coupled to an exterior surface of the body sidewall and configured to retain the combination fastener within the opening.

17. The combination fastener of claim 16, wherein the plurality of panel-retention features comprises a plurality of legs arranged as a clip assembly.

18. The combination fastener of claim 16, wherein the plurality of panel-retention features comprises a plurality of fins arranged as a push-pin assembly.

19. The combination fastener of claim 16, wherein the plurality of panel-retention features comprises a plurality of box-prong legs arranged as a box-prong assembly.

20. The combination fastener of claim 16, wherein the combination fastener is fabricated as a unitary structure.

* * * * *